United States Patent
Hamada et al.

(10) Patent No.: US 11,081,024 B2
(45) Date of Patent: Aug. 3, 2021

(54) SECURE COMPUTATION SYSTEM, SECURE COMPUTATION DEVICE, SECURE COMPUTATION METHOD, AND PROGRAM

(71) Applicants: NIPPON TELEGRAPH AND TELEPHONE CORPORATION, Chiyoda-ku (JP); TOHOKU UNIVERSITY, Sendai (JP)

(72) Inventors: Koki Hamada, Musashino (JP); Koji Chida, Musashino (JP); Satoshi Hasegawa, Musashino (JP); Masao Nagasaki, Sendai (JP); Kazuharu Misawa, Sendai (JP)

(73) Assignees: NIPPON TELEGRAPH AND TELEPHONE CORPORATION, Chiyoda-ku (JP); TOHOKU UNIVERSITY, Sendai (JP)

( * ) Notice: Subject to any disclaimer, the term of this patent is extended or adjusted under 35 U.S.C. 154(b) by 330 days.

(21) Appl. No.: 16/313,243

(22) PCT Filed: Jun. 30, 2017

(86) PCT No.: PCT/JP2017/024124
§ 371 (c)(1),
(2) Date: Dec. 26, 2018

(87) PCT Pub. No.: WO2018/008543
PCT Pub. Date: Jan. 11, 2018

(65) Prior Publication Data
US 2019/0156705 A1    May 23, 2019

(30) Foreign Application Priority Data
Jul. 6, 2016   (JP) .............................. JP2016-134086

(51) Int. Cl.
*H04L 29/06*    (2006.01)
*G09C 1/10*    (2006.01)
(Continued)

(52) U.S. Cl.
CPC .................. *G09C 1/10* (2013.01); *G09C 1/00* (2013.01); *H04L 9/0869* (2013.01); *H04L 63/0428* (2013.01)

(58) Field of Classification Search
CPC ........... G09C 1/10; G09C 1/00; H04L 9/0869; H04L 63/0428
(Continued)

(56) References Cited

PUBLICATIONS

Extended European Search Report dated Jan. 2, 2020 in Patent Application No. 17824148.5, citing document AX therein, 7 pages.
(Continued)

*Primary Examiner* — Michael S McNally
(74) *Attorney, Agent, or Firm* — Oblon, McClelland, Maier & Neustadt, L.L.P.

(57) ABSTRACT

Fisher's exact test is efficiently computed through secure computation. It is assumed that a, b, c and d are frequencies of a 2×2 contingency table, [a], [b], [c] and [d] are secure texts of the respective frequencies a, b, c and d, and N is an upper bound satisfying a+b+c+dN. A reference frequency computation part computes a secure text ($[a_0]$, $[b_0]$, $[c_0]$, $[d_0]$) of a combination of reference frequencies ($a_0$, $b_0$, $c_0$, $d_0$) which are integers satisfying $a_0+b_0=a+b$, $c_0+d_0=c+d$, $a_0+c_0=a+c$, and $b_0+d_0=b+d$. A number-of-patterns determination part determines integers $h_0$ and $h_1$ satisfying $h_0 \leq h_1$. A pattern computation part computes $[a_i]=[a_0]+i$, $[b_i]=[b_0]-i$, $[c_i]=[c_0]-i$ and $[d_i]=[d_0]+i$ for $i=h_0, \ldots, h_1$, and obtains a set $S=\{([a_i], [b_i], [c_i], [d_i])\}_i$ of secure texts of combinations of frequencies ($a_i$, $b_i$, $c_i$, $d_i$).

7 Claims, 2 Drawing Sheets

(51) Int. Cl.
 G09C 1/00 (2006.01)
 H04L 9/08 (2006.01)
(58) Field of Classification Search
 USPC .......................................................... 713/168
 See application file for complete search history.

(56) References Cited

PUBLICATIONS

F. Yates, "Contingency Tables Involving Small Numbers and the $\chi^2$ Test" Supplement to the Journal of the Royal Statistical Society, vol. 1, No. 2, XP055652891, Jan. 1, 1934, pp. 217-235.
International Search Repot dated Sep. 26, 2017 in PCT/JP2017/024124 filed Jun. 30, 2017.
Karczewski, K., "How to do a GWAS," Lecture note in GENE 210: Genomics and Personalized Medicine, 2015, 5 pages.
Chida, K. et al., "A Three-Party Secure Function Evaluation with Lightweight Verifiability Revisited," CSS 2010, 2010, 6 pages.
Zhang, Y. et al., "Secure Distributed Genome Analysis for GWAS and Sequence Comparison Computation," BMC medical informatics and decision making, vol. 15, No. Suppl 5, p. S4, 2015, 12 pages.
Hamada, K. et al., "Privacy Preserving Fisher's Exact Test (2)—For Large Samples," IPSJ SIG Technical Report, vol. 2016-CSEC-74, No. 38, Jul. 2016, pp. 1-6 (with English translation of Outline).

SECURE COMPUTATION SYSTEM, SECURE COMPUTATION DEVICE, SECURE COMPUTATION METHOD, AND PROGRAM

TECHNICAL FIELD

The present invention relates to applied cryptographic technology and, in particular, to technology of computing Fisher's exact test without disclosing input data.

BACKGROUND ART

Fisher's exact test has been widely known as one of statistical test methods that perform a hypothesis test on the presence or absence of an association between explanatory variables and response variables provided as a 2×2 contingency table. Non-patent literature 1 describes the genome-wide association study (GWAS) as a usage example of Fisher's exact test.

Fisher's exact test is described. The following table is an example of a 2×2 contingency table where n subjects are classified and counted according to the presence or absence of mutation and the presence or absence of the onset of a predetermined disease.

|  | With mutation | Without mutation | Subtotal due to disease |
|---|---|---|---|
| With disease | a | b | $n_1.$ |
| Without disease | c | d | $n_2.$ |
| Subtotal due to mutation | $n_{.1}$ | $n_{.2}$ | n | a, b, c and d represent frequencies. $n_1.$, $n_2.$, $n_{.1}$ and $n_{.2}$ represent subtotals. $n_1.=a+b$, $n_2.=c+d$, $n_{.1}=a+c$, $n_{.2}=b+d$. All of a, b, c, d, $n_1.$, $n_2.$, $n_{.1}$ and $n_{.2}$ are non-negative integers.

Here, for a non-negative integer i, the probability $p_i$ defined by an equation (1) is computed. According to the magnitude relationship between the sum of probabilities p represented by an equation (2) and a predetermined value α, which is called a significance level, the presence or absence of association between explanatory variables (the presence or absence of mutation in the above table) and response variables (the presence or absence of the disease in the above table) is tested. Here, $p_a$ is a probability value computed by the equation (1) about the contingency table where actual aggregation values a, b, c and d are adopted as frequencies.

$$p_i = \frac{(a+b)!(c+d)!(a+c)!(b+d)!}{i!(a+b-i)!(a+c-i)!(d-a+i)!(a+b+c+d)!} \quad (1)$$

$$p = \sum_{i \text{ s.t } p_i \le p_a} p_i \quad (2)$$

Methods of obtaining specific operation results without decrypting encrypted numerical values include a method called secure computation (see Non-patent literature 2, for example). The method of Non-patent literature 2 performs encryption that allows three secure computation devices to hold the divided fragments of the numerical value, and the three secure computation devices perform cooperative computation, which can allow the three secure computation devices to hold the results of addition and subtraction, constant addition, multiplication, constant multiplication, logical operation (negation, logical multiplication, logical addition, and exclusive OR), and data notation conversion (integer, and binary numeral) without decrypting the numerical value, in a state of being distributed among the three secure computation devices, i.e., being left encrypted.

There is a conventional research that performs genome-wide association study while keeping genome information secret using cryptographic technology, in consideration of the sensitivity and secrecy of the genome information (see Non-patent literature 3, for example). Non-patent literature 3 proposes a method of performing a chi-square test while keeping genome information secret.

PRIOR ART LITERATURE

Non-Patent Literature

Non-patent literature 1: Konrad Karczewski, "How to do a GWAS", Lecture note in GENE 210: Genomics and Personalized Medicine, 2015.

Non-patent literature 2: Koji Chida, Koki Hamada, Dai Ikarashi, and Katsumi Takahashi, "A Three-Party Secure Function Evaluation with Lightweight Verifiability Revisited", CSS 2010, 2010.

Non-patent literature 3: Yihua Zhang, Marina Blanton, and Ghada Almashaqbeh, "Secure distributed genome analysis for gwas and sequence comparison computation", BMC medical informatics and decision making, Vol. 15, No. Suppl 5, p. S4, 2015.

SUMMARY OF THE INVENTION

Problems to be Solved by the Invention

However, according to the conventional art, for computation of each probability $p_i$, it is assumed that $a_i=i$, $b_i=b+a-i$, $c_i=c+a-i$, and $d_i=d-a+i$, it is also assumed that the maximum i with $b_i \ge 0$ and $c_i \ge 0$ is $i_1$ and it is also assumed that the minimum i with $a_i \ge 0$ and $d_i \ge 0$ is $i_0$, and then $p_i$ is computed for each i that satisfies $i_0 \le i \le i_1$. Here, the number of combinations of frequencies ($a_i$, $b_i$, $c_i$ and $d_i$) to be computed is identified based on the values of $i_0$ and $i_1$. The number can be used for information for estimating input values a, b, c and d. Accordingly, secure texts $\{([a_i], [b_i], [c_i]$ and $[d_i])\}_i$ of the combination of frequencies ($a_i$, $b_i$, $c_i$ and $d_i$) to be computed cannot be obtained while keeping the input secret.

In view of the above point, the secure computation technology of the present invention has an object to compute Fisher's exact test efficiently through secure computation.

Means to Solve the Problems

To solve the above problems, the secure computation system of the present invention is a secure computation system comprising three or more secure computation devices, wherein it is assumed that a, b, c and d are non-negative integers, a is a frequency on a first row and a first column of a 2×2 contingency table, b is a frequency on the first row and a second column of the contingency table, c is a frequency on a second row and the first column of the contingency table, d is a frequency on the second row and the second column of the contingency table, [a], [b], [c] and [d] are secure texts of the respective frequencies a, b, c and d, and N is an upper bound satisfying a+b+c+d, the secure computation device comprises: a reference frequency computation part that computes a secure text ($[a_0]$, $[b_0]$, $[c_0]$, $[d_0]$) of a combination of reference frequencies ($a_0$, $b_0$, $c_0$, $d_0$) which are integers satisfying $a_0+b_0=a+b$, $c_0+d_0=c+d$, $a_0+c_0=a+c$, and $b_0+d_0=b+d$; a number-of-patterns determination part that determines integers $h_0$ and $h_1$ satisfying $h_0 \leq h_1$; and a pattern computation part that computes $[a_i]=[a_0]+i$, $[b_i]=[b_0]-i$, $[c_i]=[c_0]-i$ and $[d_i]=[d_0]+i$ for $i=h_0, \ldots, h_1$, and obtains a set $S=\{([a_i], [b_i], [c_i], [d_i])\}_i$ of secure texts of combinations of frequencies $(a_i, b_i, c_i, d_i)$.

Effects of the Invention

The present invention can enumerate the combinations of frequencies $(a_i, b_i, c_i, d_i)$ while reducing the number of elements of the set $S=\{([a_i], [b_i], [c_i], [d_i])\}_i$ of secure texts to be output, without disclosing the number of combinations of frequencies $(a_i, b_i, c_i, d_i)$ which are computation targets of Fisher's exact test. Consequently, Fisher's exact test can be efficiently computed through secure computation. Specifically, the effects of reducing the amount of use of computational resources and of reducing the processing time to about ½ can be expected. Furthermore, Fisher's exact test can be executed, with the genome information being kept secret. That is, for example, execution results of Fisher's exact test on integrated data can be obtained while genome data items held by multiple research institutes are kept secret and are not disclosed to each other, an execution environment for genome analysis having a significantly high security level can be provided, and further development in healthcare can be expected accordingly.

DETAILED DESCRIPTION OF THE EMBODIMENTS

Prior to the description of embodiments, the notation scheme in this Description is described.

<Notation>

A value secured by applying encryption or secret sharing to a certain value "a" is called the secure text of "a" and is represented as [a]. Meanwhile, "a" is called the plain text of [a]. In a case where the securing is secret sharing, a set of the secret sharing fragments held by the individual parties according to [a] is referred to.

Hereinafter, embodiments of the present invention are described in detail. In the diagrams, configuration parts having the same functions are assigned the same numerals, and redundant description thereof is omitted.

First Embodiment

Figure 1:
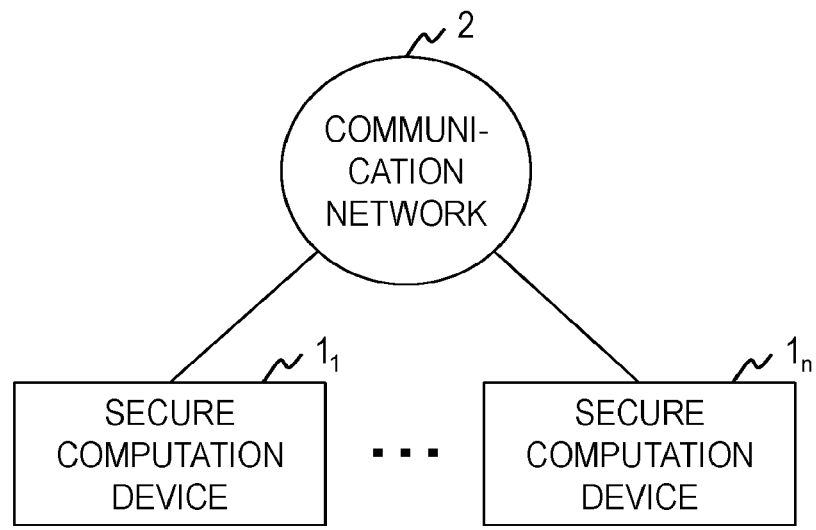
FIG. 1 is a diagram exemplifying a functional configuration of a secure computation system.

A secure computation system of a first embodiment comprises n ($\geq 3$) secure computation devices $1_1, \ldots, 1_n$, as exemplified in FIG. 1. In this embodiment, the secure computation devices $1_1, \ldots, 1_n$ are each connected to a communication network 2. The communication network 2 is a communication network that is of a circuit switching scheme or a packet switching scheme and is configured to allow the secure computation devices $1_1, \ldots, 1_n$ to communicate with each other. For example, the Internet, a LAN (Local Area Network), a WAN (Wide Area Network) or the like may be used. Each device is not necessarily capable of communicating online via the communication network 2. For example, it may be configured such that information to be input into the secure computation devices $1_i$ ($i \in \{1, \ldots, n\}$) may be stored in a portable recording medium, such as magnetic tape or a USB memory, and input may be performed offline from the portable recording medium.

Figure 2:
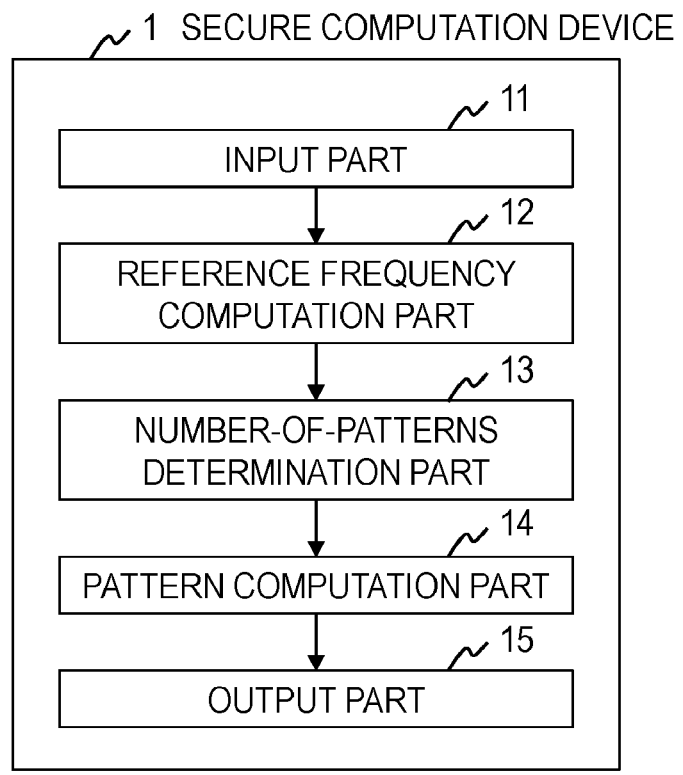
FIG. 2 is a diagram exemplifying a functional configuration of a secure computation device.

As exemplified in FIG. 2, the secure computation device 1 includes an input part 11, a reference frequency computation part 12, a number-of-patterns determination part 13, a pattern computation part 14, and an output part 15. The secure computation device 1 performs the process of each step exemplified in FIG. 3, thereby achieving a secure computation method of the first embodiment.

The secure computation device 1 is, for example, a special device configured to include a publicly known or dedicated computer which includes a central processing unit (CPU) and a main memory (RAM: Random Access Memory) and the like and into which a special program has been read. The secure computation device 1 executes each process under control by the central processing unit, for example. Data input into the secure computation device 1 and data obtained by each process are stored in the main memory, for example. The data stored in the main memory is read into the central processing unit as required, and is used for another process. At least some of the processing parts of the secure computation device 1 may be configured by hardware, such as an integrated circuit.

Figure 3:
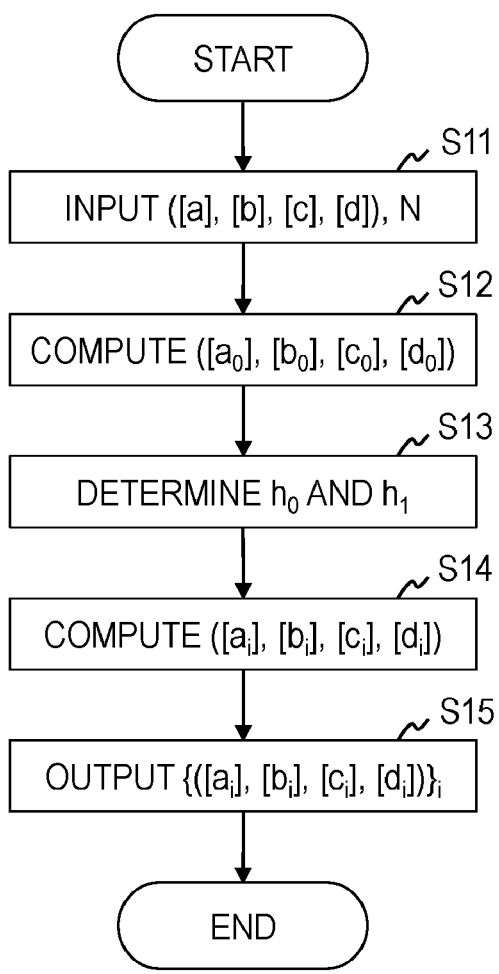
FIG. 3 is a diagram exemplifying processing procedures of a secure computation method.

Referring to FIG. 3, the processing procedures of the secure computation method of the first embodiment are described.

In step S11, a secure text ([a], [b], [c], [d]) of a combination of frequencies (a, b, c, d) in a 2×2 contingency table, and an upper bound N that satisfies $a+b+c+d \leq T$ are input into the input part 11. Here, the 2×2 contingency table is defined by the following formulae, and a, b, c and d are non-negative integers.

|  | With event 1 | Without event 1 | Subtotal due to event 2 |
|---|---|---|---|
| With event 2 | a | b | $n_{1\bullet}$ |
| Without event 2 | c | d | $n_{2\bullet}$ |
| Subtotal due to event 1 | $n_{\bullet 1}$ | $n_{\bullet 2}$ | n |

In step S12, the reference frequency computation part 12 uses the secure text ([a], [b], [c], [d]) of the combination of the frequencies (a, b, c, d) to compute a secure text ([$a_0$], [$b_0$], [$c_0$], [$d_0$]) of a combination of integers ($a_0$, $b_0$, $c_0$, $d_0$) satisfying the following equations. Hereinafter, $a_0$, $b_0$, $c_0$ and $d_0$ are called reference frequencies $$a_0+b_0=a+b,$$

$$c_0 \pm d_0=c+d,$$

$$a_0+c_0=a+c,$$

$$b_0+d_0=b+d$$

For example, the reference frequency computation part 12 may compute the following equations to obtain the secure text ([$a_0$], [$b_0$], [$c_0$], [$d_0$]) of the combination of the reference frequencies ($a_0$, $b_0$, $c_0$, $d_0$).

$$[a_0]=0,$$

$$[b_0]=[b]+[a],$$

$[c_0]=[c]+[a]$, $[d_0]=[d]-[a]$

In step S13, the number-of-patterns determination part 13 determines integers $h_0$ and $h_1$ that satisfy $h_0 \leq h_1$. Here, it is determined such that $h_0=0$, and $h_1=N$, for example.

In step S14, the pattern computation part 14 computes the following equations for each integer i ranging from $h_0$ to $h_1$, inclusive, to obtain the secure text ($[a_i]$, $[b_i]$, $[c_i]$, $[d_i]$) of the combination of frequencies ($a_i$, $b_i$, $c_i$, $d_i$).

$[a_i]=[a_0]+i$, $[b_i]=[b_0]-i$, $[c_i]=[c_0]-i$, $[d_i]=[d_0]+i$

In step S15, a set $S=\{([a_i], [b_i], [c_i], [d_i])\}_{i=h0, \ldots, h1}$ of secure texts of the combinations of $(h_1-h_0+1)$ frequencies ($a_i$, $b_i$, $c_i$, $d_i$) is output from the output part 15.

The set S is a set where only one $j \in \{h_0, \ldots, h_1\}$ resides that satisfies $a'=a_j$, $b'=b_j$, $c'=c_j$ and $d'=d_j$ for every combination of integers (a', b', c', d') satisfying $a' \geq 0$, $b' \geq 0$, $c' \geq 0$, $d' \geq 0$, $a'+b'=a+b$, $c'+d'=c+d$, $a'+c'=a+c$ and $b'+d'=b+d$. That is, the set mutually exclusively includes all combinations of non-negative integers with values varying so as not to change the subtotals in the contingency table, for given a, b, c and d. Here, the set S may include combinations of integers (that may include negative integers) with each subtotal being the same in the contingency table.

According to the secure computation technology of the first embodiment, the number of secure texts of the combinations of frequencies included in the output set S is determined by the disclosed value N. Consequently, the given frequencies a, b, c and d cannot be estimated. Accordingly, the combinations of frequencies which are computation targets of the Fisher's exact test can be enumerated, with the input being kept secret.

Second Embodiment

Referring to FIG. 3, the processing procedures of the secure computation method of a second embodiment are described. Hereinafter, differences from the first embodiment described above are mainly described.

In step S12, the reference frequency computation part 12 computes [e]=min([a], [d]). Here min(•) is a function of outputting the minimum value among the arguments. That is, [a] and [d] are compared with each other with the values being kept secret, and secure text of the smaller value is regarded as [e]. Subsequently, the reference frequency computation part 12 computes the following equations to obtain the secure text ($[a_0]$, $[b_0]$, $[c_0]$, $[d_0]$) of the combination of the reference frequencies ($a_0$, $b_0$, $c_0$, $d_0$).

$[a_0]=[a]-[e]$, $[b_0]=[b]+[e]$, $[c_0]=[c]+[e]$, $[d_0]=[d]-[e]$

In step S13, the number-of-patterns determination part 13 computes $h_0=0$ and $h_1=\text{floor}(N/2)$ to determine the integers $h_0$ and $h_1$. Here, floor(•) is a floor function for outputting the maximum integer equal to or less than •. That is, $h_1$ can be represented by the following equation.

$$h_1 = \left\lfloor \frac{N}{2} \right\rfloor$$

In step S14, the pattern computation part 14 uses the secure text ($[a_0]$, $[b_0]$, $[c_0]$, $[d_0]$) of the combination of the reference frequencies ($a_0$, $b_0$, $c_0$, $d_0$) and the integers $h_0$ and $h_1$ obtained as described above to obtain the secure text ($[a_i]$, $[b_i]$, $[c_i]$, $[d_i]$) of the combination of frequencies ($a_i$, $b_i$, $c_i$, $d_i$), as with the first embodiment.

According to the secure computation technology of the second embodiment, the number of secure texts of the combinations of frequencies included in the output set S is determined by the disclosed value N, as with the first embodiment. Consequently, the given frequencies a, b, c and d cannot be estimated. In comparison with the first embodiment, the number of secure texts of the combination of the frequencies included in the set S decreases. Consequently, Fisher's exact test can be more efficiently computed.

According to the configuration as described above, the secure computation technology of the present invention can enumerate all the combinations of frequencies which are to be computed, without disclosing the number of combinations of the frequencies (a, b, c, d) which are to be computed, and can efficiently compute Fisher's exact test through secure computation without disclosing the input information.

The embodiments of the present invention have thus been described above. However, the specific configuration is not limited to that in these embodiments. Even if the design is appropriately changed in a range without departing from the spirit of the present invention, it is a matter of course that the configuration is included in the present invention. The various processes described in the embodiments can be executed in a time-series manner according to the order of the description. Alternatively, such execution may be performed in parallel or individually, in conformity with the processing capability of the device that executes the processes, or as required.

[Program and Recording Medium]

In the cases where the various processing functions in each device described in the embodiments are implemented with a computer, the processing content of the functions that each device should have is described as a program. The program is executed by the computer, thereby achieving the various processing functions in each device described above on the computer.

The program that describes the processing content can be preliminarily recorded in a computer-readable recording medium. The computer-readable recording medium may be, for example, any computer-readable recording medium, such as a magnetic recording device, an optical disk, a magneto-optical recording medium, or a semiconductor memory.

The program is distributed by, for example, selling, transferring, or lending a portable recording medium, such as DVD or CD-ROM, where the program is recorded. Alternatively, a configuration may be adopted where the program may be preliminarily stored in a storing device of a server computer, and the program may be transferred from the server computer to another computer via a network, thereby distributing the program.

For example, the computer for executing such a program, first, stores the program recorded in a portable recording medium or transferred from a server computer, temporarily in its storing device. At the time of executing the process, the computer reads the program recorded in its recording medium, and executes the processes according to the read program. According to another execution mode of this program, the computer may directly read the program from the portable recording medium, and execute the processes according to the program. Further alternatively, every time the program is transferred to the computer from the server computer, the computer may successively execute the process according to the received program. Another configuration may be adopted that executes the processes described above through a service of what is called an ASP (Application Service Provider) type according to which the program is not transferred from the server computer to the computer concerned, and the processing function is achieved only by an execution instruction therefor and acquisition of the result. The program according to the embodiments include information that is provided for the processes by the computer and conforms to the program (data and the like that are not direct instructions to the computer but have characteristics defining the processes of the computer).

According to the embodiments, this device is thus configured by executing a predetermined program on the computer. Alternatively, at least a part of the processing content may be achieved as hardware.

INDUSTRIAL APPLICABILITY

As is obvious from the result of application to the genome-wide association study described above, the secure computation technology of the present invention is applicable to execution of Fisher's exact test through secure computation with information on an aggregate table being kept secret, in analysis using Fisher's exact test, for example, genome-wide association study, genome analysis, clinical research, social investigation, academic research, analysis of examination results, marketing research, statistical computation, medical information analysis, customer information analysis, and sales analysis.

What is claimed is:

1. A secure computation system comprising three or more secure computation devices,
    wherein it is assumed that a, b, c and d are non-negative integers, a is a frequency on a first row and a first column of a 2×2 contingency table, b is a frequency on the first row and a second column of the contingency table, c is a frequency on a second row and the first column of the contingency table, d is a frequency on the second row and the second column of the contingency table, [a], [b], [c] and [d] are secure texts of the respective frequencies a, b, c and d, and N is an upper bound satisfying $a+b+c+d \leq N$,
    each secure computation device comprises circuitry configured to:
    receive, over a network, an input of the secure texts ([a], [b], [c], [d]), wherein the original respective frequencies a, b, c and d are concealed from each of the secret computation devices;
    compute a secure text ($[a_0]$, $[b_0]$, $[c_0]$, $[d_0]$) of a combination of reference frequencies ($a_0$, $b_0$, $c_0$, $d_0$) which are integers satisfying $a_0+b_0=a+b$, $c_0+d_0=c+d$, $a_0+c_0=a+c$, and $b_0+d_0=b+d$;
    determine integers $h_0$ and $h_1$ satisfying $h_0 \leq h_1$; and
    compute $[a_i]=[a_0]+i$, $[b_i]=[b_0]-i$, $[c_i]=[c_0]-i$ and $[d_i]=[d_0]+i$ for $i=h_0, \ldots, h_1$, and obtain a set $S=\{([a_i], [b_i], [c_i], [d_i])\}_i$ of secure texts of combinations of frequencies ($a_i$, $b_i$, $c_i$, $d_i$).

2. The secure computation system according to claim 1, wherein the circuitry computes $[a_0]=0$, $[b_0]=[b]+[a]$, $[c_0]=[c]+[a]$ and $[d_0]=[d]-[a]$, obtains the secure text ($[a_0]$, $[b_0]$, $[c_0]$, $[d_0]$), and
    determines $h_0=0$, and $h_1=N$.

3. The secure computation system according to claim 1, wherein min(•) represents a minimum value among arguments •, and floor(•) represents a maximum integer equal to or less than a value •,
    the circuitry computes $[e]=\min([a], [d])$, computes $[a_0]=[a]-[e]$, $[b_0]=[b]+[e]$, $[c_0]=[c]+[e]$ and $[d_0]=[d]-[e]$, obtains the secure text ($[a_0]$, $[b_0]$, $[c_0]$, $[d_0]$), and
    determines that $h_0=0$, $h_1=\text{floor}(N/2)$.

4. The secure computation system according to any one of claims 1 to 3,
    wherein the contingency table is genome information obtained by classifying and counting according to presence or absence of mutation and presence or absence of an onset of a disease.

5. A secure computation device configured to be implemented in a secure computation system comprising three or more secure computation devices, wherein it is assumed that a, b, c and d are non-negative integers, a is a frequency on a first row and a first column of a 2×2 contingency table, b is a frequency on the first row and a second column of the contingency table, c is a frequency on a second row and the first column of the contingency table, d is a frequency on the second row and the second column of the contingency table, [a], [b], [c] and [d] are secure texts of the respective frequencies a, b, c and d, and N is an upper bound satisfying $a+b+c+d \leq N$,
    the secure computation device comprises circuitry configured to:
    receive, over a network, an input of the secure texts ([a], [b], [c], [d]), wherein the original respective frequencies a, b, c and d are concealed from the secret computation devices in the secure computation system;
    compute a secure text ($[a_0]$, $[b_0]$, $[c_0]$, $[d_0]$) of a combination of reference frequencies ($a_0$, $b_0$, $c_0$, $d_0$) which are integers satisfying $a_0$, $b_0=a+b$, $c_0+d_0=c+d$, $a_0+c_0=a+c$, and $b_0+d_0=b+d$;
    determine integers $h_0$ and $h_1$ satisfying $h_0 \leq h_1$; and
    compute $[a_i]=[a_0]+i$, $[b_i]=[b_0]-i$, $[c_i]=[c_0]-i$ and $[d_i]=[d_0]+i$ for $i=h_0, \ldots, h_1$, and obtain a set $S=\{([a_i], [b_i], [c_i], [d_i])\}_i$ of secure texts of combinations of frequencies ($a_i$, $b_1$, $c_i$, $d_i$).

6. A secure computation method implemented in a secure computation system comprising three or more secure computation devices, wherein it is assumed that a, b, c and d are non-negative integers, a is a frequency on a first row and a first column of a 2×2 contingency table, b is a frequency on the first row and a second column of the contingency table, c is a frequency on a second row and the first column of the contingency table, d is a frequency on the second row and the second column of the contingency table, [a], [b], [c] and [d] are secure texts of the respective frequencies a, b, c and d, and N is an upper bound satisfying $a+b+c+d \leq N$,
    the secure computation method comprising by circuitry of each secure computation device:
    receiving, over a network, an input of the secure texts ([a], [b], [c], [d]), wherein the original respective frequencies a, b, c and d are concealed from each of the secret computation devices;
    computing a secure text ($[a_0]$, $[b_0]$, $[c_0]$, $[d_0]$) of a combination of reference frequencies ($a_0$, $b_0$, $c_0$, $d_0$) which are integers satisfying $a_0+b_0=a+b$, $c_0+d_0=c+d$, $a_0+c_0=a+c$, and $b_0+d_0=b+d$, determining integers $h_0$ and $h_1$ satisfying $h_0 \leq h_1$ by the circuitry of the secure computation device, and computing $[a_i]=[a_0]+i$, $[b_i]=[b_0]-i$, $[c_i]=[c_0]-i$ and $[d_i]=[d_0]+i$ for $i=h_0, \ldots, h_1$, and obtaining a set $S=\{([a_i], [b_i], [c_i], [d_i])\}_i$ of secure texts of combinations of frequencies $(a_i, b_i, c_i, d_i)$ by the circuitry of the secure computation device.

7. A non-transitory computer readable medium including computer executable instructions that make a secure computation device perform a method, the secure computation device being configured to be implemented in a secure computation system comprising three or more secure computation devices, wherein it is assumed that a, b, c and d are non-negative integers, a is a frequency on a first row and a first column of a 2×2 contingency table, b is a frequency on the first row and a second column of the contingency table, c is a frequency on a second row and the first column of the contingency table, d is a frequency on the second row and the second column of the contingency table, [a], [b], [c] and [d] are secure texts of the respective frequencies a, b, c and d, and N is an upper bound satisfying a+b+c+d<N, the method comprising:

receiving, over a network, an input of the secure texts ([a], [b], [c], [d]), wherein the original respective frequencies a, b, c and d are concealed from the secret computation devices in the secure computation system;

computing a secure text ($[a_0]$, $[b_0]$, $[c_0]$, $[d_0]$) of a combination of reference frequencies ($a_0$, $b_0$, $c_0$, $d_0$) which are integers satisfying $a_0+b_0=a+b$, $c_0+d_0=c+d$, $a_0+c_0=a+c$, and $b_0+d_0=b+d$, determining integers $h_0$ and $h_1$ satisfying $h_0 \leq h_1$; and computing $[a_i]=[a_0]+i$, $[b_i]=[b_0]-i$, $[c_i]=[c_0]-i$ and $[d_i]=[d_0]+i$ for $i=h_0, \ldots, h_1$, and obtaining a set $S=\{([a_i], [b_i], [c_i], [d_i])\}_i$ of secure texts of combinations of frequencies $(a_i, b_i, c_i, d_i)$.

\* \* \* \* \*